US012730487B2

(12) United States Patent
Zhang et al.

(10) Patent No.: US 12,730,487 B2
(45) Date of Patent: Sep. 8, 2026

(54) THERMAL MANAGEMENT CHIP AND SYSTEM WITH BUILT-IN INTERFACE HOST, AND MANAGEMENT METHOD

(71) Applicant: SENSYLINK MICROELECTRONICS INC., Shanghai (CN)

(72) Inventors: Hui Zhang, Shanghai (CN); Yu Wang, Shanghai (CN)

(73) Assignee: SENSYLINK MICROELECTRONICS INC., Shanghai (CN)

( * ) Notice: Subject to any disclaimer, the term of this patent is extended or adjusted under 35 U.S.C. 154(b) by 442 days.

(21) Appl. No.: 18/284,553

(22) PCT Filed: Oct. 24, 2022

(86) PCT No.: PCT/CN2022/126890
§ 371 (c)(1),
(2) Date: Sep. 28, 2023

(87) PCT Pub. No.: WO2024/031839
PCT Pub. Date: Feb. 15, 2024

(65) Prior Publication Data

US 2024/0370068 A1 Nov. 7, 2024

(30) Foreign Application Priority Data

Aug. 11, 2022 (CN) ........................ 202210961278.X

(51) Int. Cl.
*G06F 1/20* (2006.01)

(52) U.S. Cl.
CPC .................................... *G06F 1/206* (2013.01)

(58) Field of Classification Search
CPC ... G06F 1/206; G06F 1/20; G06F 1/16; G06F 1/00; Y02D 10/00
See application file for complete search history.

(56) References Cited

U.S. PATENT DOCUMENTS 6,172,611 B1 * 1/2001 Hussain .................. G06F 1/206 713/323
6,545,438 B1 * 4/2003 Mays, II .................. H02P 6/20 318/400.08

(Continued)

FOREIGN PATENT DOCUMENTS

CN 101811434 A 8/2010
CN 106773954 A 5/2017

(Continued)

*Primary Examiner* — Mohamed Charioui
(74) *Attorney, Agent, or Firm* — Bayramoglu Law Offices LLC

(57) ABSTRACT

A thermal management chip and system with a built-in interface host, and a management method are provided. The thermal management chip includes a controllable current source sequence, a temperature sensing device category decision module, an analog-to-digital converter (ADC) module, a register bank & interface & control logic module, a non-volatile memory (NVM), a clock generator, and a local temperature sensing transistor The thermal management chip further includes an Aip port, an Ain port, a pulse-width modulation (PWM) port, a tachometer (TACH) port, a master-slave mode select port, a serial data (SDA) port, a serial clock (SCL) port, and a status indication port.

13 Claims, 4 Drawing Sheets

(56) References Cited

U.S. PATENT DOCUMENTS

| | | | | |
|---|---|---|---|---|
| 9,971,609 | B2 * | 5/2018 | Balakrishnan | G06F 11/30 |
| 2006/0212679 | A1 | 9/2006 | Alfano et al. | |
| 2007/0140030 | A1 * | 6/2007 | Wyatt | G11C 5/00<br>365/212 |
| 2022/0320991 | A1 * | 10/2022 | Radhakrishnan | H02M 1/0032 |

FOREIGN PATENT DOCUMENTS

| | | | | |
|---|---|---|---|---|
| CN | 108731833 | A | 11/2018 | |
| CN | 109211417 | A | 1/2019 | |
| CN | 216750052 | U | 6/2022 | |
| WO | WO-2022034091 | A1 * | 2/2022 | H05K 7/20209 |

* cited by examiner

THERMAL MANAGEMENT CHIP AND SYSTEM WITH BUILT-IN INTERFACE HOST, AND MANAGEMENT METHOD

CROSS REFERENCE TO THE RELATED APPLICATIONS

This application is the national phase entry of International Application No. PCT/CN2022/126890, filed on Oct. 24, 2022, which is based upon and claims priority to Chinese Patent Application No. 202210961278.X, filed on Aug. 11, 2022, the entire contents of which are incorporated herein by reference.

TECHNICAL FIELD

The present disclosure relates to the technical field of chips and thermal management, and in particular to a thermal management chip and system with a built-in interface host, and a management method.

BACKGROUND

Air cooling is still the most economical cooling method at present, and is still the only choice for most systems that cannot achieve heat dissipation through natural convection of air. As a key executing component in the air cooling system, a fan includes a bearing and other parts. If the fan continues to rotate at full speed, it may become the component with the shortest lifespan in the air cooling system. Moreover, the fan speed must be controlled to save energy and reduce noise.

In the fields of servers, switches, and data centers, temperature measurement is necessary to achieve purposes such as temperature monitoring, over-temperature alarm, and adaptive adjustment. For example, temperature measurement is needed to monitor the temperature of chips such as a central processing unit (CPU), a graphics processing unit (GPU), and a field-programmable gate array (FPGA). When the temperature exceeds a limit, the fan is started, or the operating frequency is reduced, so as to reduce the temperature and prevent system damage and fire risk caused by excessive temperature.

Chinese patent application CN216750052 provides a thermal management device and a thermal management system for a battery. Specifically, a semiconductor cooler is attached to an outer surface of a liquid storage tank, and a battery pack is located in a circulating circuit. The power of the semiconductor cooler is adjusted based on temperatures acquired by inlet and outlet temperature sensors. A heated or cooled antifreeze fluid is driven to circulate in the circulating circuit, so as to achieve the purpose of thermal management. However, there is no disclosure about the method of acquiring the temperatures by the inlet and outlet temperature sensors, and the cooling method belongs to water cooling. In addition, the thermal management system involves multiple components that cooperate with each other, with high cost, low accuracy, and special requirements for the assembly of the circulating circuit.

Chinese patent application CN101811434 provides a thermal management system and fan group control method for a passenger car. The thermal management system includes a fan group, a driving device, a control device, a temperature sensor, and a human-machine interaction device. A cooled medium is maintained within a constant temperature range, so as to achieve real-time control and extend the working life of the components. However, the constitution of the thermal management system is complex due to multiple components, and the fan control strategy is too simple.

SUMMARY

To overcome the shortcomings in the prior art, an objective of the present disclosure is to provide a thermal management chip and system with a built-in interface host, and a management method.

An embodiment of the present disclosure provides a thermal management chip with a built-in interface host. The thermal management chip includes a controllable current source sequence, a temperature sensing device category decision module, an analog-to-digital converter (ADC) module, a register bank & interface & control logic module, a non-volatile memory (NVM), a clock generator, and a local temperature sensing transistor; the thermal management chip further includes an Aip port, an Ain port, a pulse-width modulation (PWM) port, a tachometer (TACH) port, a master-slave mode select port, a serial data (SDA) port, a serial clock (SCL) port, and a status indication port;

the controllable current source sequence is provided with an input terminal connected to a power supply of the thermal management chip, an output terminal connected to a Vip pin of the ADC module, and a control terminal connected to the temperature sensing device category decision module, and the temperature sensing device category decision module is connected to the register bank & interface & control logic module;

the ADC module includes the Vip pin connected to the Aip port and a Vin pin connected to the Ain port, and is configured to connect an external temperature sensing device and acquire temperature information;

an emitter of the local temperature sensing transistor is connected to the ADC module, and a base and a collector of the local temperature sensing transistor are connected together and grounded; and Dtemp and $D_{NTC}$ signals of the ADC module are sent to the register bank & interface & control logic module:

the register bank & interface & control logic module is connected to the PWM port and the TACH port, and is configured to monitor and control an external fan; and the register bank & interface & control logic module is further connected to the status indication port, the SCL port, the SDA port, and the master-slave mode select port; and the clock generator is separately connected to the register bank & interface & control logic module and the NVM; and the NVM is separately connected to the SCL port, the SDA port, the master-slave mode select port, and a programming port.

Furthermore, a plurality of sets of Aip ports and Ain ports are arranged in parallel for connecting a plurality of temperature sensing devices.

One or more embodiments of the present disclosure provide a thermal management system with a built-in interface host. The thermal management system includes the thermal management chip with a built-in interface host, and further includes a remote temperature sensing device, a fan unit, and a master-slave mode select switch, where the remote temperature sensing device is separately connected to a Vip port and a Vin port of the thermal management chip; the fan unit is separately connected to the PWM port and the TACH port; and the master-slave mode select switch is connected to the master-slave mode select port.

Furthermore, the remote temperature sensing device is any one of a discrete transistor 2N3904, a discrete transistor 2N3906, a parasitic transistor, and a thermistor.

Furthermore, the fan unit is provided with a plurality of channels of fans; the PWM port is configured to output a fan unit speed control signal; and the TACH port is configured to input a fan speed monitoring signal.

Furthermore, the master-slave mode select switch is separately connected to an external power supply and a ground signal;

when a master-slave mode pin is grounded, the thermal management chip is in a slave mode, where the thermal management chip receives instructions from an external microprogrammed control unit (MCU) through the SCL port and the SDA port to configure the register bank & interface & control logic module to control a measurement of the remote temperature sensing device and a speed of the fan unit; and when the master-slave mode pin is connected to the power supply, the thermal management chip is in a master mode, where the thermal management chip runs a program in the NVM to control the measurement of the remote temperature sensing device and the speed of the fan unit, is connected to a peripheral device, including an electrically erasable programmable read-only memory (EEPROM) and a temperature sensor, through the SCL port and the SDA port, and outputs a status signal through the status indication port.

One or more embodiments of the present disclosure provide a management method for the thermal management system with a built-in interface host, including the following steps:

step S1: acquiring measurement data of the remote temperature sensing device;

step S2: counting, by the clock generator, a fan TACH output; storing a counting result, denoted as NFAN, in the register bank & interface & control logic module; and acquiring a fan speed;

step S3 acquiring a thermal management parameter configuration table, acquiring a corresponding fan speed parameter based on the temperature information, outputting a corresponding PWM signal, and controlling the fan speed; and step S4: outputting an alarm signal by the status indication port when the fan unit reaches a maximum speed and a temperature is still above an upper limit of the thermal management parameter configuration table.

Furthermore, step S1 further includes: outputting, by the controllable current source sequence, two currents, namely $I_1$ and $N*I_1$, when the remote temperature sensing device is a discrete transistor or a parasitic transistor; and performing, by the ADC module, a conversion to acquire a corresponding temperature:

$$\Delta V_{BE} = V_{BE2} - V_{BE1} = N * \frac{kT}{q}\ln\left(\frac{N * I_1}{I_s}\right) - \frac{kT}{q}\ln\left(\frac{I_1}{I_s}\right) = \frac{kT}{q}\ln(N)$$

$$D_{TEMP} = \frac{\Delta V_{BE}}{V_{REF}} * A_1 + B_1$$

where, $V_{BE}$ denotes a base-emitter voltage of the local temperature sensing transistor; when an emitter current is $I_1$, the base-emitter voltage is $V_{BE1}$; when the emitter current is $N*_1$, the base-emitter voltage is $V_{BE2}$; $V_{REF}$ denotes a reference voltage of the ADC module: $A_1$ denotes a slope coefficient; and $B_1$ denotes an offset coefficient; and acquiring, when the remote temperature sensing device is a thermistor, a corresponding temperature:

$$D_{NTC} = \frac{V_{NTC}}{V_{REF}} * A_2 + B_2$$

where, $V_{NTC}$ denotes a voltage of the thermistor; $A_2$ denotes a slope coefficient; and $B_2$ denotes an offset coefficient.

Furthermore, step S1 further includes: receiving, by the SCL port and the SDA port, data from a peripheral temperature sensor, when the thermal management chip is in the master mode.

Furthermore, a temperature source of the thermal management parameter configuration table includes the local temperature sensing transistor, the remote temperature sensing device, or a peripheral temperature sensor.

BRIEF DESCRIPTION OF THE DRAWINGS

Other features, objectives, and advantages of the present disclosure will become more apparent by reading the detailed description of non-limiting embodiments with reference to the following drawings.

REFERENCE NUMERALS

| | | | |
|---|---|---|---|
| 100. | thermal management chip | 107. | local temperature sensing transistor |
| 101. | controllable current source sequence | 110. | discrete transistor |
| 102. | temperature sensing device category decision module | 111. | parasitic transistor |
| | | 112. | thermistor |
| 103. | ADC module | 120. | fan unit |
| 104. | register bank & interface & control logic module | 130. | master-slave mode select switch |
| 105. | NVM | | |
| 106. | clock generator | | |

DETAILED DESCRIPTION OF THE EMBODIMENTS

The present disclosure is described in detail below with reference to specific embodiments. The following embodiments will help those skilled in the art further understand the present disclosure, but will not limit the present disclosure in any way. It should be noted that several variations and improvements can also be made by a person of ordinary skill in the art without departing from the conception of the present disclosure. These all fall within the protection scope of the present disclosure.

One or more embodiments of the present disclosure disclose thermal management chip 100. The thermal management chip is configured to acquire a temperature value of a monitoring point, introduce a method such as a lookup table and a custom temperature-speed relationship, and control a plurality of channels of fans through a PWM output to achieve the purpose of thermal management. The thermal management chip can save power consumption and extend the service life of the fans. A built-in local temperature measurement point can measure an ambient temperature of the thermal management chip 100. In addition, the thermal management chip can measure a remote temperature. Innovatively, in a remote temperature measurement solution, different modes can be configured according to the type of a remote temperature sensing device. When a port is configured to be in a current output mode, the thermal management chip 100 can output a specific sequence of currents with controlled timing to the outside. The thermal management chip can use a discrete bipolar transistor such as 2N3904 NPN and 2N3906 PNP and can also use an integrated transistor such as processor or application specific integrated circuit (ASIC) parasitic transistor 111. The port can also be configured to be in a voltage input mode, implemented by measuring the voltage of thermistor 112, such as a negative temperature coefficient (NTC) resistor. In addition, an embodiment of the present disclosure provides a built-in interface host. The built-in interface host can serve as an interface slave device to report a temperature to a master chip, such as a baseboard management controller (BMC), and can also serve as an interface master chip to read temperature chip data on an I2C bus of the system. The design expands the usage and temperature sources.

Figure 1:
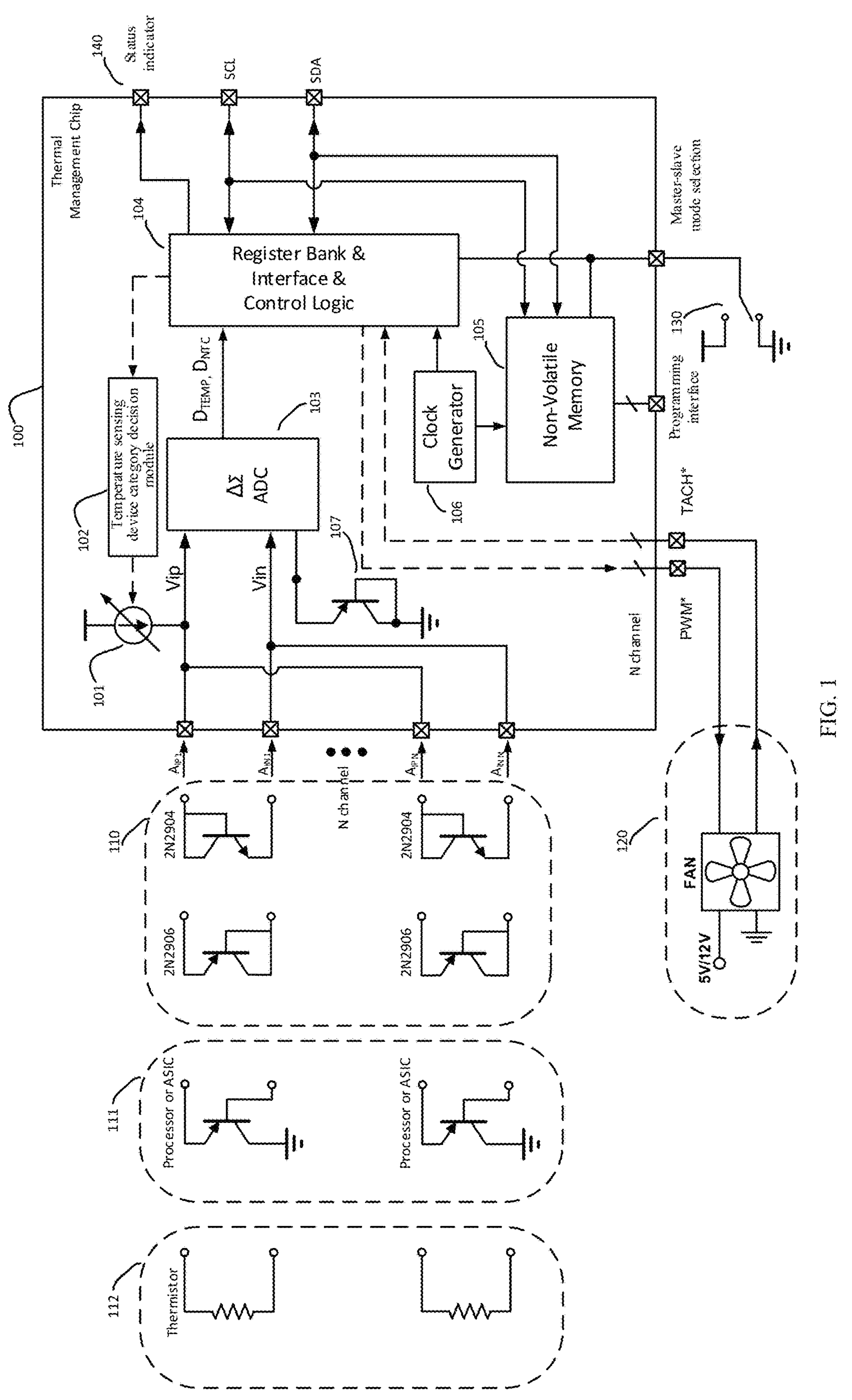
FIG. 1 is a schematic diagram of a thermal management chip and a peripheral device according to an embodiment of the present disclosure.

Specifically, as shown in FIG. 1, the thermal management chip 100 includes controllable current source sequence 101, temperature sensing device category decision module 102, analog-to-digital converter (ADC) module 103, register bank & interface & control logic module 104, non-volatile memory (NVM) 105, clock generator 106, and local temperature sensing transistor 107. The thermal management chip 100 further includes an Aip port, an Ain port, a pulse-width modulation (PWM) port, a tachometer (TACH) port, a master-slave mode select port, a serial data (SDA) port, a serial clock (SCL) port, and a status indication port.

The controllable current source sequence 101 is provided with an input terminal connected to a power supply of the thermal management chip, an output terminal connected to a Vip pin of the ADC module 103, and a control terminal connected to the temperature sensing device category decision module 102. The temperature sensing device category decision module 102 is connected to the register bank & interface & control logic module 104.

The ADC module 103 includes the Vip pin connected to the Aip port and a. Vin pin connected to the Ain port, and is configured to connect an external temperature sensing device and acquire temperature information.

An emitter of the local temperature sensing transistor 107 is connected to the ADC module 103, and a base and a collector of the local temperature sensing transistor 107 are connected together and grounded. Dtemp and $D_{NTC}$ signals of the ADC module 103 are sent to the register bank & interface & control logic module 104.

The register bank & interface & control logic module 104 is connected to the PWM port and the TACH port, and is configured to monitor and control an external fan. The register bank & interface & control logic module 104 is further connected to the status indication port, the SCL port, the SDA port, and the master-slave mode select port.

The clock generator 106 is separately connected to the register bank & interface & control logic module 104 and the NVM 105. The NVM 105 is separately connected to the SCL port, the SDA port, the master-slave mode select port, and a programming port. A plurality of sets of Aip ports and Ain ports are arranged in parallel for connecting a plurality of temperature sensing devices.

One or more embodiments of the present disclosure provide a thermal management system with a built-in interface host. The thermal management system includes the thermal management chip 100 with a built-in interface host, and further includes a remote temperature sensing device, a fan unit 120, and a master-slave mode select switch 130. The remote temperature sensing device is separately connected to a Vip port and a Yin port of the thermal management chip 100. The fan unit 120 is separately connected to the PWM port and the TACH port. The master-slave mode select switch 130 is connected to the master-slave mode select port.

The remote temperature sensing device is any one of a discrete transistor 1102N3904, a discrete transistor 1102N3906, parasitic transistor 111, and thermistor 112. The fan unit 120 is provided with a plurality of channels of fans; the PVM port is configured to output a fan unit 120 speed control signal. The TACH port is configured to input a fan speed monitoring signal.

The master-slave mode select switch 130 is separately connected to an external power supply and a ground signal.

Figure 2:
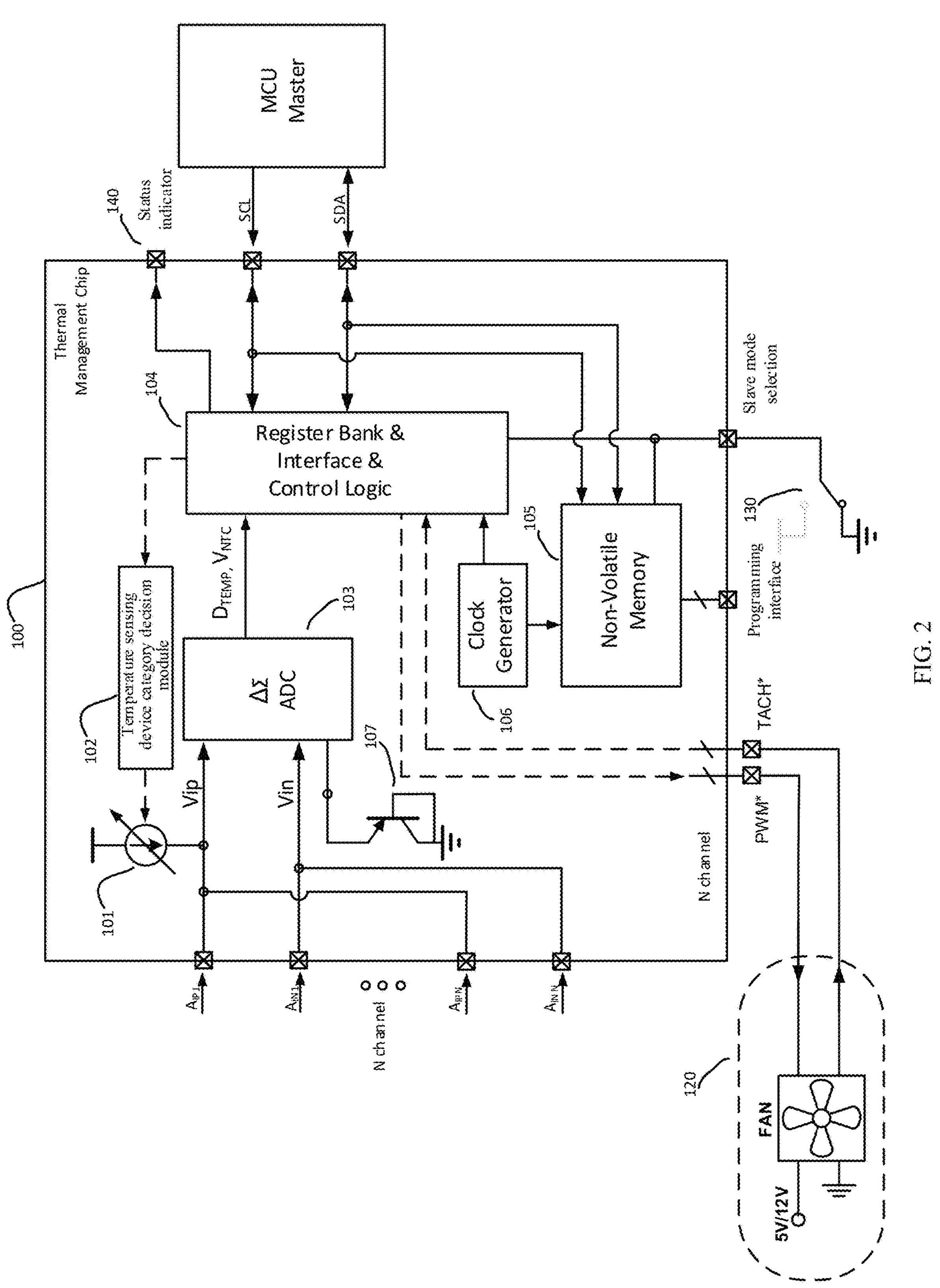
FIG. 2 is a schematic diagram of the thermal management chip in a slave mode according to an embodiment of the present disclosure.

As shown in FIG. 2, when a master-slave mode pin is grounded, the thermal management chip 100 is in a slave mode, where the thermal management chip receives instructions from an external microprogrammed control unit (MCU) through the SCL port and the SDA port to configure the register bank & interface & control logic module 104 to control a measurement of the remote temperature sensing device and a speed of the fan unit 120.

Figure 3:
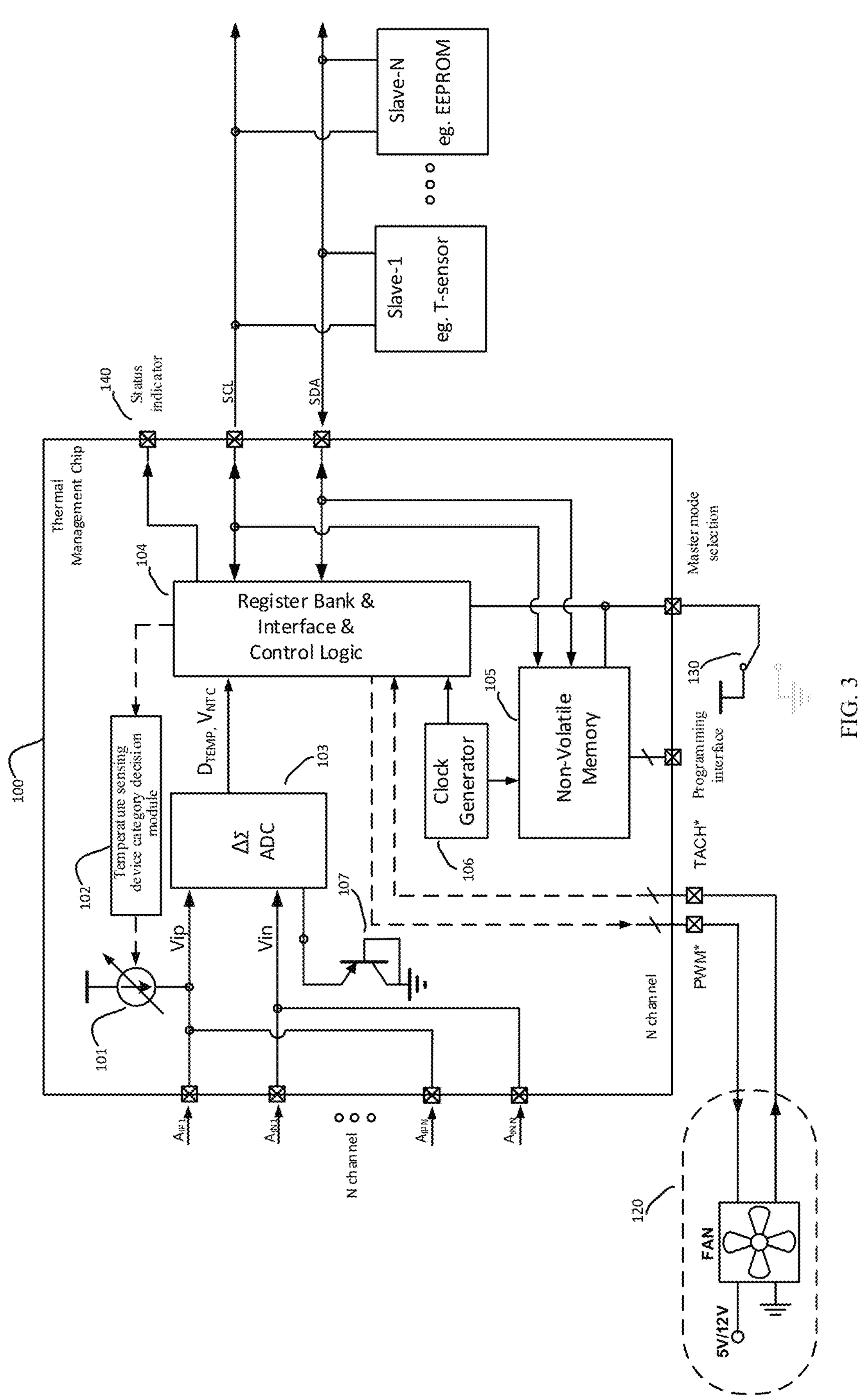
FIG. 3 is a schematic diagram of the thermal management chip in a master mode according to an embodiment of the present disclosure.

As shown in FIG. 3, when the master-slave mode pin is connected to the power supply, the thermal management chip 100 is in a master mode, where the thermal management chip runs a program in the NVM 105 to control the measurement of the remote temperature sensing device and the speed of the fan unit 120, is connected to a peripheral device, including an electrically erasable programmable read-only memory (EEPROM) and a temperature sensor, through the SCL port and the SDA port, and outputs a status signal through the status indication port.

One or more embodiments of the present disclosure provide a management method for the thermal management system with a built-in interface host. A user can connect the power supply or ground as needed to control the chip in the master or slave modes. The user can choose the type of the remote temperature sensing device based on different system costs and measurement objects. The user can connect a required number of channels according to a need of a board, and the chip supports up to 4 channels of fans. After a peripheral device is determined, an internal related register is configured, and a thermal management closed-loop process is started.

Specifically, the management method includes the following steps.

S1. Measurement data of the remote temperature sensing device is acquired.

When the remote temperature sensing device is a discrete transistor or a parasitic transistor, the controllable current source sequence 101 outputs two currents, namely $I_1$ and $N^*I_1$, and the ADC module 103 performs a conversion to acquire a corresponding temperature:

$$\Delta V_{BE} = V_{BE2} - V_{BE1} = N * \frac{kT}{q}\ln\left(\frac{N * I_1}{I_s}\right) - \frac{kT}{q}\ln\left(\frac{I_1}{I_s}\right) = \frac{kT}{q}\ln(N)$$

$$D_{TEMP} = \frac{\Delta V_{BE}}{V_{REF}} * A_1 + B_1$$

where, $V_{BE}$ denotes a base-emitter voltage of the local temperature sensing transistor; when an emitter current is $I_1$, the base-emitter voltage is $V_{BE1}$; when the emitter current is $N*I_1$, the base-emitter voltage is $V_{BE2}$; $V_{REF}$ denotes a reference voltage of the ADC module; $A_1$ denotes a slope coefficient; and $B_1$ denotes an offset coefficient.

When the remote temperature sensing device is a thermistor, a corresponding temperature is acquired:

$$D_{NTC} = \frac{V_{NTC}}{V_{REF}} * A_2 + B_2$$

where, $V_{NTC}$ denotes a voltage of the thermistor; $A_2$ denotes a slope coefficient; and $B_2$ denotes an offset coefficient.

In addition, when the chip is configured to be in the master mode, the temperature DEXT of other sensor on the bus is acquired through the SCL port and the SDA port, so as to expand the temperature information source.

S2. The clock generator 106 counts a fan TACK output, stores a counting result, denoted as NFAN, in the register bank & interface & control logic module 104, and a fan speed is acquired.

S3. A thermal management parameter configuration table is acquired, a corresponding fan speed parameter is acquired based on the temperature information, a corresponding PWM signal is output, and the fan speed is controlled.

S4. When the fan unit 120 reaches a maximum speed and a temperature is still above an upper limit of the thermal management parameter configuration table, the status indication port outputs an alarm signal.

Figure 4:
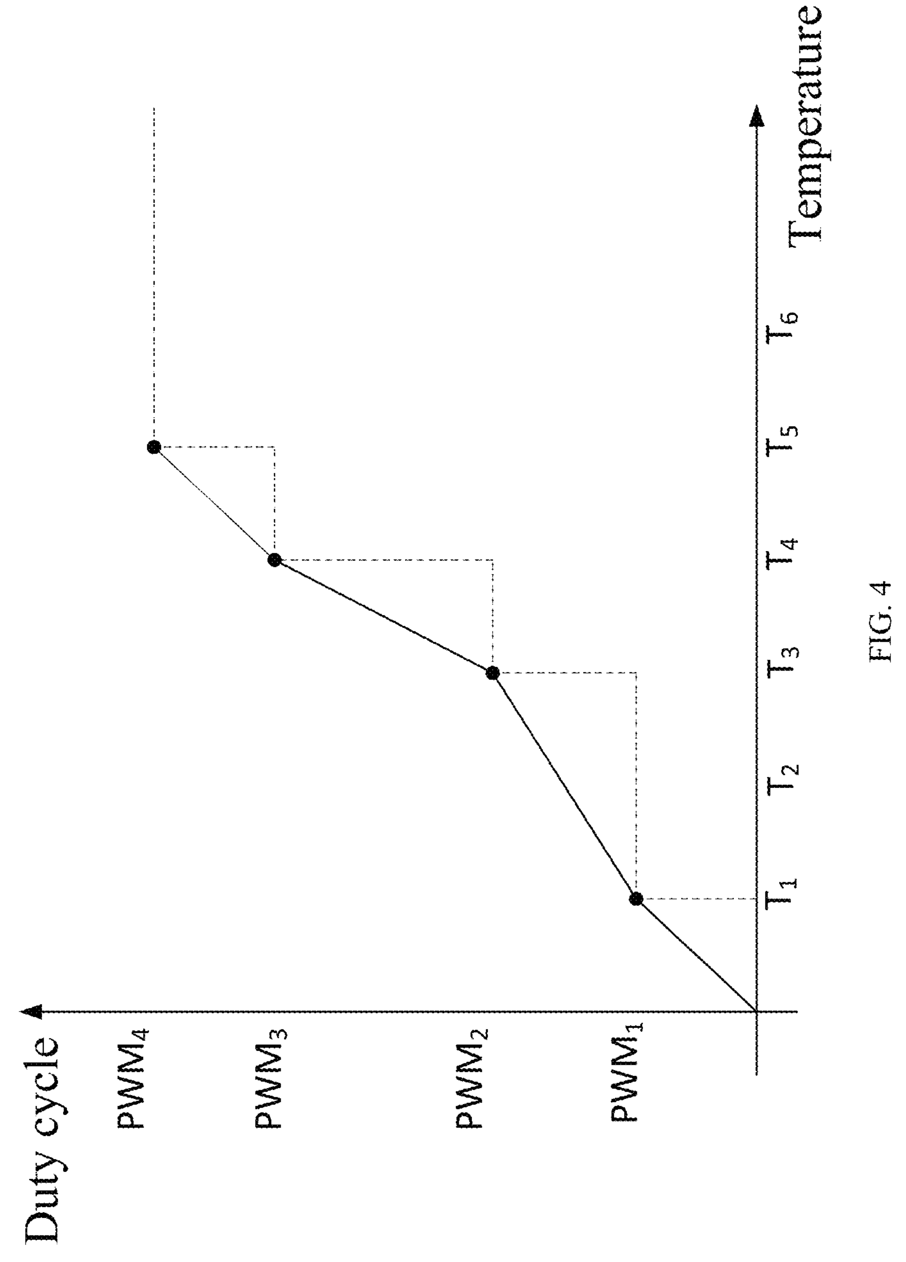
FIG. 4 is a schematic diagram of the thermal management chip that controls a speed through a lookup table according to an embodiment of the present disclosure.

One or more embodiments of the present disclosure provide a temperature and PWM control. An example of a lookup table is shown in FIG. 4. Specifically, in this example, the lookup table can be modified and programmed through the NVM to adapt to different usage environments.

The PWM signal is selected through the lookup table, so as to control the fan speed for thermal management. The method has the advantages of simple operation and direct logic. Based on the typical example of the present disclosure, as shown in FIG. 4, the temperature source can be a local temperature or a temperature of a remote transistor or remote NTC resistor. The PWM signal can control one or more channels of fans, and can be configured through the register bank & interface & control logic module 104. As shown by the dashed line in the figure, different temperature ranges correspond to different duty cycles, as shown in the table below. T1, T2, T3, T4, T5, PWM1, PWM2, PWM3, and PWM4 can all be configured through the register bank & interface & control logic module 104 or the NVM.

| Temperature T | Duty cycle |
|---|---|
| 0 < T < T1 | 0 |
| T1 < T < T3 | PWM1 |
| T3 < T < T4 | PWM2 |
| T4 < T < T5 | PWM3 |
| T > T5 | PWM4 |

In addition, if there are special requirements for fan noise and control linearity, a smart mode can also be configured through the register bank & interface & control logic module 104. As shown by the solid line in the figure, the PWM varies linearly with the temperature.

Compared with the prior art, the present disclosure has the following beneficial effects.

1. The present disclosure acquires the local temperature of the thermal management chip, the remote temperature, and the fan speed information, and flexibly controls the fan speed through the lookup table, thereby achieving the purpose of reducing system energy consumption and extending fan life.

2. The present disclosure can configure the interface slave mode and master mode through chip pins. In the slave mode, the present disclosure can receive instructions from the external MCU or other host for system thermal management. When the system has no host or the host fails, the thermal management chip can enter the master mode to manage other components of the system and expand the temperature information input source.

The specific embodiments of the present disclosure are described above. It should be understood that the present disclosure is not limited to the above specific implementations, and a person skilled in the art can make various variations or modifications within the scope of the claims without affecting the essence of the present disclosure. The embodiments in the present disclosure and features in the embodiments may be freely combined with each other in a non-conflicting manner.

What is claimed is:

1. A thermal management system with a built-in interface host, comprising:

a thermal management chip with a built-in interface host;

a remote temperature sensing device;

a fan unit; and and a master-slave mode select switch;

wherein the remote temperature sensing device is separately connected to a Vip port and a Vin port of the thermal management chip; the fan unit is separately connected to the PWM port and the TACH port; and the master-slave mode select switch is connected to the master-slave mode select port; and wherein the thermal management chip with the built-in interface host comprises:

a controllable current source sequence, a temperature sensing device category decision module, an analog-to-digital converter (ADC) module, a register bank, interface and control logic module, a non-volatile memory (NVM), a clock generator, a local temperature sensing transistor, an Aip port, an Ain port, a pulse-width modulation (PWM) port, a tachometer (TACH) port, a master-slave mode select port, a serial data (SDA) port, a serial clock (SCL) port, and a status indication port;

the controllable current source sequence is provided with an input terminal connected to a power supply of the thermal management chip, an output terminal connected to a Vip pin of the ADC module, and a control terminal connected to the temperature sensing device category decision module; and the temperature sensing device category decision module is connected to the register bank, interface and control logic module;

the ADC module comprises the Vip pin connected to the Aip port and a Vin pin connected to the Ain port, and the ADC module is configured to connect an external temperature sensing device and acquire temperature information:

an emitter of the local temperature sensing transistor is connected to the ADC module, and a base and a collector of the local temperature sensing transistor are connected together and grounded; and Dtemp and $D_{NTC}$ signals of the ADC module are sent to the register bank, interface and control logic module:

the register bank, interface and control logic module is connected to the PWM port and the TACH port, and the register bank, interface and control logic module is configured to monitor and control an external fan; and the register bank, interface and control logic module is further connected to the status indication port, the SCL port, the SDA port, and the master-slave mode select port; and the clock generator is separately connected to the register bank, interface and control logic module and the NVM; and the NVM is separately connected to the SCL port, the SDA port, the master-slave mode select port, and a programming port.

2. A management method for the thermal management system with the built-in interface host according to claim 1, comprising the following steps:

step S1: acquiring measurement data of the remote temperature sensing device;

step S2: counting, by the clock generator, a fan TACH output; storing a counting result, denoted as NFAN, in the reregister bank, interface and control logic module; and acquiring a fan speed;

step S3: acquiring a thermal management parameter configuration table, acquiring a corresponding fan speed parameter based on the temperature information, outputting a corresponding PWM signal, and controlling the fan speed; and step S4: outputting an alarm signal by the status indication port when the fan unit reaches a maximum speed and a temperature is still above an upper limit of the thermal management parameter configuration table.

3. The management method according to claim 2, wherein step S1 further comprises: outputting, by the controllable current source sequence, two currents, namely $I_1$ and $N*I_1$, when the remote temperature sensing device is a discrete transistor or a parasitic transistor; and performing, by the ADC module, a conversion to acquire a corresponding temperature:

$$\Delta V_{BE} = V_{BE2} - V_{BE1} = N * \frac{kT}{q}\ln\left(\frac{N * I_1}{I_s}\right) - \frac{kT}{q}\ln\left(\frac{I_1}{I_s}\right) = \frac{kT}{q}\ln(N)$$

$$D_{TEMP} = \frac{\Delta V_{BE}}{V_{REF}} * A_1 + B_1$$

wherein, $V_{BE}$ denotes a base-emitter voltage of the local temperature sensing transistor; when an emitter current is $I_1$, the base-emitter voltage is $V_{BE1}$; when the emitter current is $N*I_1$, the base-emitter voltage is $V_{BE2}$; $V_{REF}$ denotes a reference voltage of the ADC module; $A_1$ denotes a first slope coefficient; and $B_1$ denotes an offset coefficient; and acquiring, when the remote temperature sensing device is a thermistor, a corresponding $$D_{NTC} = \frac{V_{NTC}}{V_{REF}} * A_2 + B_2$$

temperature:

wherein, $V_{NTC}$ denotes a voltage of the thermistor; $A_2$ denotes a second slope coefficient; and $B_2$ denotes an offset coefficient.

4. The management method according to claim 2, wherein step S1 further comprises: receiving, by the SCL port and the SDA port, data from a peripheral temperature sensor, when the thermal management chip is in the master mode.

5. The management method according to claim 2, wherein a temperature source of the thermal management parameter configuration table comprises the local temperature sensing transistor, the remote temperature sensing device, or a peripheral temperature sensor.

6. The management method according to claim 2, wherein in the thermal management system with the built-in interface host, the remote temperature sensing device is any one of a discrete transistor 2N3904, a discrete transistor 2N3906, a parasitic transistor, and a thermistor.

7. The management method according to claim 2, wherein in the thermal management system with the built-in interface host, the fan unit is provided with a plurality of channels of fans; the PWM port is configured to output a fan unit speed control signal; and the TACH port is configured to input a fan speed monitoring signal.

8. The management method according to claim 2, wherein in the thermal management system with the built-in interface host, the master-slave mode select switch is separately connected to an external power supply and a ground signal;

when a master-slave mode pin is grounded, the thermal management chip is in a slave mode, wherein the thermal management chip receives instructions from an external microprogrammed control unit (MCU) through the SCL port and the SDA port to configure the register bank, interface and control logic module to control a measurement of the remote temperature sensing device and a speed of the fan unit; and when the master-slave mode pin is connected to the external power supply, the thermal management chip is in a master mode, wherein the thermal management chip runs a program in the NVM to control the measurement of the remote temperature sensing device and the speed of the fan unit, is connected to a peripheral device through the SCL port and the SDA port, and outputs a status signal through the status indication port, wherein the peripheral device comprises an electrically erasable programmable read-only memory (EEPROM) and a temperature sensor.

9. The thermal management system with the built-in interface host according to claim 1, wherein the remote temperature sensing device is any one of a discrete transistor 2N3904, a discrete transistor 2N3906, a parasitic transistor, and a thermistor.

10. The thermal management system with the built-in interface host according to claim 1, wherein the fan unit is provided with a plurality of channels of fans; the PWM port is configured to output a fan unit speed control signal; and the TACH port is configured to input a fan speed monitoring signal.

11. The thermal management system with the built-in interface host according to claim 1, wherein the master-slave mode select switch is separately connected to an external power supply and a ground signal;

when a master-slave mode pin is grounded, the thermal management chip is in a slave mode, wherein the thermal management chip receives instructions from an external microprogrammed control unit (MCU) through the SCL port and the SDA port to configure the register bank, interface and control logic module to control a measurement of the remote temperature sensing device and a speed of the fan unit; and when the master-slave mode pin is connected to the external power supply, the thermal management chip is in a master mode, wherein the thermal management chip runs a program in the NVM to control the measurement of the remote temperature sensing device and the speed of the fan unit, the thermal management chip is connected to a peripheral device through the SCL port and the SDA port, and the thermal management chip outputs a status signal through the status indication port, wherein the peripheral device comprises an electrically erasable programmable read-only memory (EEPROM) and a temperature sensor.

12. The thermal management system with the built-in interface host according to claim 1, wherein in the thermal management chip with the built-in interface host, a plurality of sets of Aip ports and Ain ports are arranged in parallel for connecting a plurality of temperature sensing devices.

13. The thermal management system with the built-in interface host according to claim 1, wherein a plurality of sets of Aip ports and Ain ports are arranged in parallel for connecting a plurality of temperature sensing devices in the thermal management chip with the built-in interface host.

* * * * *